United States Patent [19]

Baettig

[11] Patent Number: 5,721,344
[45] Date of Patent: Feb. 24, 1998

[54] INK COMPOSITIONS CONTAINING AZO DYES FOR INK JET PRINTING

[75] Inventor: Kurt Baettig, Praroman, Switzerland

[73] Assignee: Ilford A.G., Switzerland

[21] Appl. No.: 684,388

[22] Filed: Jul. 19, 1996

[30] Foreign Application Priority Data

Jul. 26, 1995 [GB] United Kingdom ............... 9515304.5

[51] Int. Cl.$^6$ .................. C09B 29/09; C09B 29/22; C09B 29/36; C09B 31/14
[52] U.S. Cl. .................. 534/776; 534/796; 534/897; 534/803
[58] Field of Search ................... 534/776, 796, 534/797, 803

[56] References Cited

U.S. PATENT DOCUMENTS

| | | | |
|---|---|---|---|
| 3,122,531 | 2/1964 | Atkinson et al. | 534/803 X |
| 3,459,729 | 8/1969 | Crotti et al. | 534/776 |
| 3,658,783 | 4/1972 | Knobloch et al. | 534/776 X |
| 5,466,282 | 11/1995 | Eida et al. | 534/792 X |

FOREIGN PATENT DOCUMENTS

| | | | |
|---|---|---|---|
| 0273343 | 7/1988 | European Pat. Off. | 534/776 |
| 2702627 | 7/1978 | Germany | 534/803 |
| 63-207861 | 8/1988 | Japan | 534/776 |
| 63-207862 | 8/1988 | Japan | 534/776 |
| 63-280769 | 11/1988 | Japan | 534/803 |

*Primary Examiner*—Floyd D. Higel
*Attorney, Agent, or Firm*—Ostrager, Chong & Flaherty

[57] ABSTRACT

There is described novel azo dyes of formula (4) with high water solubility for use in aqueous inks, particularly for ink jet recording, which provide images having high water, smudge and light resistance

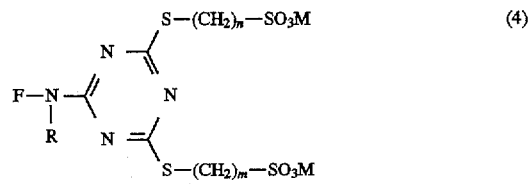

wherein
n, m are each independently 2 to 6;
R is hydrogen or an aliphatic radical having from 1 to 6 atoms;
M is hydrogen, a metal atom, preferentially an alkali metal, an ammonium or ammonium substituted with alkyl, alkoxyalkyl or hydroxyalkyl each having 1 to 12 C atoms
and
F represents a mono-azo or a poly-azo dye residue.

14 Claims, No Drawings

INK COMPOSITIONS CONTAINING AZO DYES FOR INK JET PRINTING

FIELD OF THE INVENTION

The present invention relates to azo dyes and aqueous ink compositions comprising these dyes for ink jet printing processes.

More particularly, it is the aim of this invention to provide dyes with high water solubility for use in aqueous ink compositions which provide images having high water, smudge and light resistance.

BACKGROUND OF THE INVENTION

Ink jet printing systems generally are of two types: continuous stream and drop-on-demand. In continuous stream ink jet systems, ink is emitted in a continuous stream under pressure through an orifice or nozzle. The stream is perturbed, causing it to break up into droplets at a fixed distance from the orifice. At the break up point, the droplets are charged in accordance with digital data signals and passed through an electrostatic field which adjusts the trajectory of each droplet in order to direct it to a waste ink collecting vessel (e.g. for recirculation) or a specific location on a recording medium. In drop-on-demand systems, a droplet is expelled from an orifice to a position on a recording medium in accordance with digital data signals. A droplet is not formed or expelled unless it is to be placed on the recording medium.

The most important part of an ink used in ink jet printing are the dyes. Although a number of dyes have been proposed none has been produced which meets all the requirements of a modern printing process.

Reactive dyes with incorporated 1,3,5-triazine structural elements are common in textile printing and have also been proposed for ink jet printing. Such dyes are for several reasons in general not too well suited for this application. The reactive groups are not very stable over prolonged periods in aqueous solutions. Dyes containing such reactive groups are moreover, due to their potential health risk, less suitable for handling in a non industrial environment. Non reactive dyes of this kind have been described for example in U.S. Pat. Nos. 4,771,129, 4,777,248, 4,780,532, 4,968, 784, 4,975,118, 4,997,919, 5,118,737, and in Japanese Patent Application 5,171,053. In particular dyes of the following structural formulas have been described:

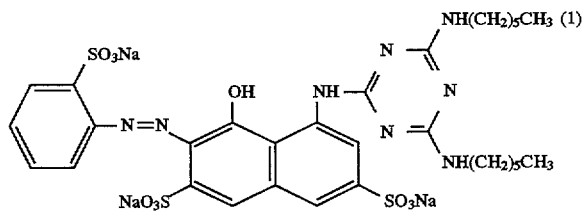

US Patent 4'771'129 (dye 5)

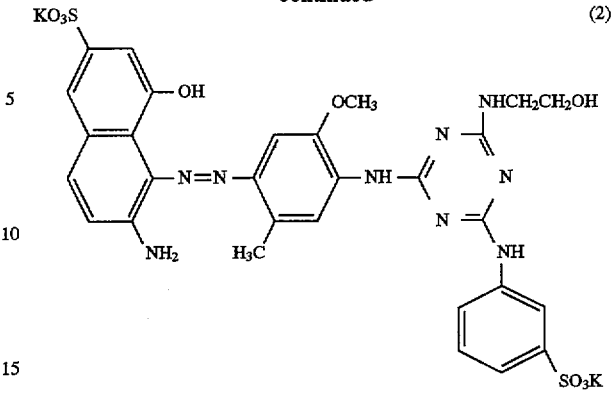

US Patent 4'777'248 (dye 1)

In some of these dyes particularly enhanced water solubility has been claimed to be due to the introduction of elements of the following structure

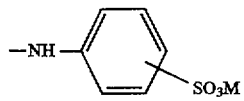

and in some cases water solubility seems still to be improved by introduction of a polyalkoxy moiety into the triazine part of the dye (U.S. Pat. No. 4,777,248).

These dyes are however still inadequate when used in aqueous inks of modern ink jet printers. In particular printers of the continuous stream type are highly demanding as far as physical properties of the inks are concerned. Particularly critical is the storage stability of the inks without forming degradation products prone to clog the nozzles of the printer. Printers are today able to print images of high density rapidly. Therefore highly concentrated inks are needed in order to avoid the jetting of high water volumes onto the receiving layers. These high concentrations should ideally, for environmental reasons, be achieved without the use of organic cosolvents. Such inks can only be prepared with dyes having a particularly high water solubility.

Dyes of the above mentioned structures considered to be the state of the art, are in general not soluble or stable enough and when used in aqueous inks, do not satisfy all the required demands.

In particular the inks should meet the following criteria:
(1) Physical properties of the ink, such as viscosity, conductivity and surface tension, are each within a defined range.
(2) All dyes have good solubility in the ink medium to give solutions having good stability which do not plug the fine ejecting orifices.
(3) The ink gives images of sufficient optical density.
(4) The ink gives images of sufficient water resistance.
(5) The ink gives images of good light fastness.
(6) The ink gives images of good smudge resistance.
(7) The ink does not change physical properties or deposit solid matter during storage.

DESCRIPTION OF THE INVENTION

It is the aim of this invention to provide novel azo dyes of formula (4) with high water solubility for use in aqueous inks, particularly for ink jet recording, which provide images having high water, smudge and light resistance

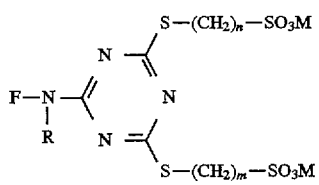

wherein n,m are each independently 2 to 6;

R is hydrogen or an aliphatic radical having from 1 to 6 C atoms;

M is hydrogen, a metal atom, preferentially an alkali metal, an ammonium or ammonium substituted with alkyl, alkoxyalkyl or hydroxyalkyl each having 1 to 12 C atoms and F represents a mono-azo or a poly-azo dye residue.

The present invention will be described in more detail by the following examples. The following structures are to be considered as an illustration of the invention only and not to limit the scope of the claimed structures in any way.

Specific embodiments of the dyes represented by the formula (4) where F represents a mono-azo dye residue are illustrated below.

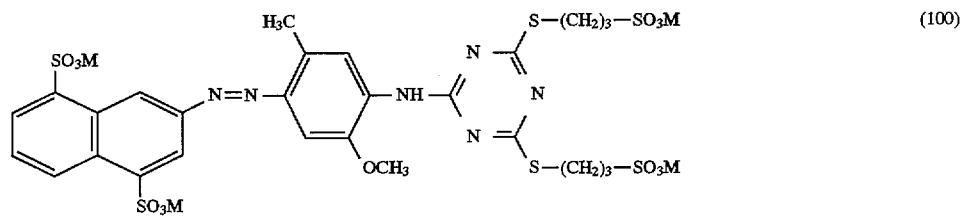

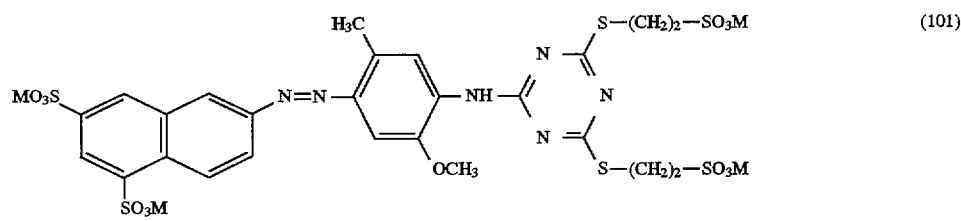

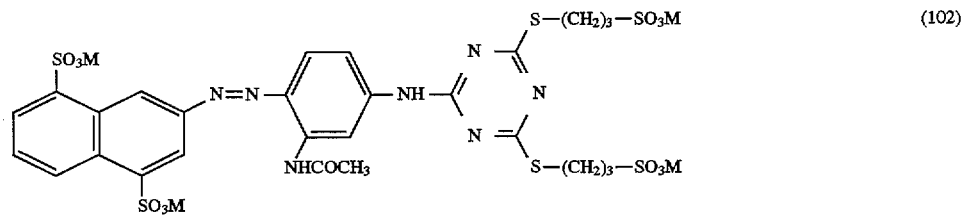

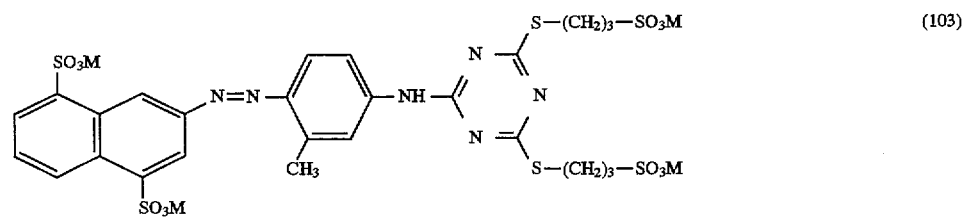

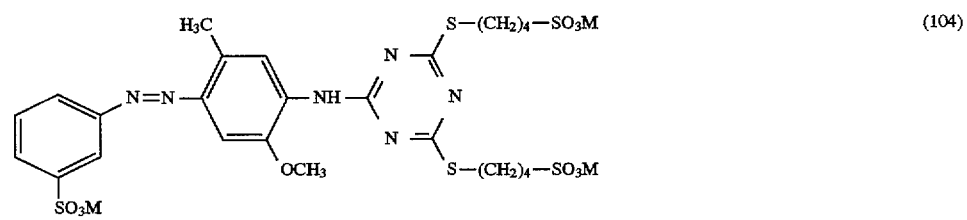

-continued
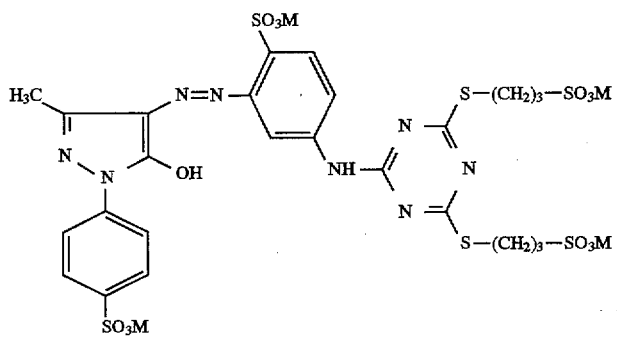
(105)
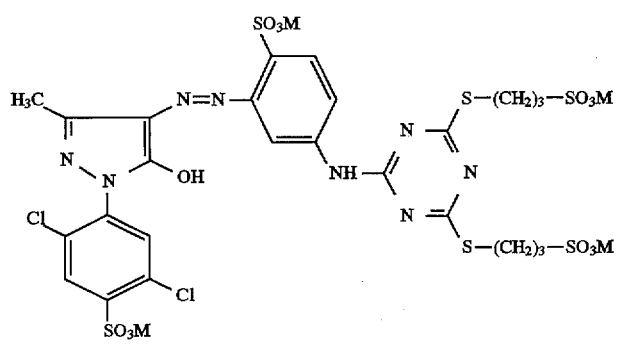
(106)
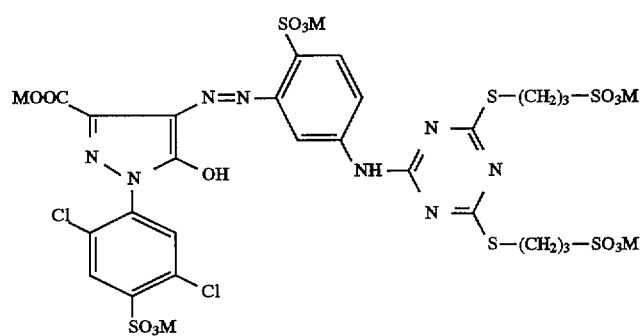
(107)
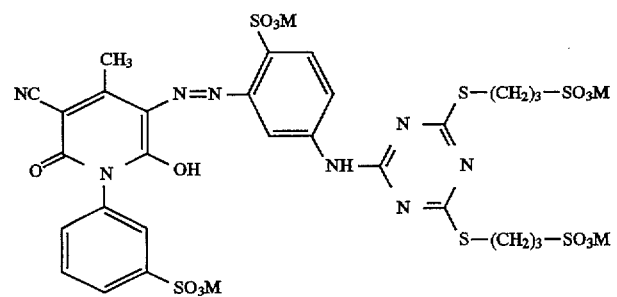
(108)
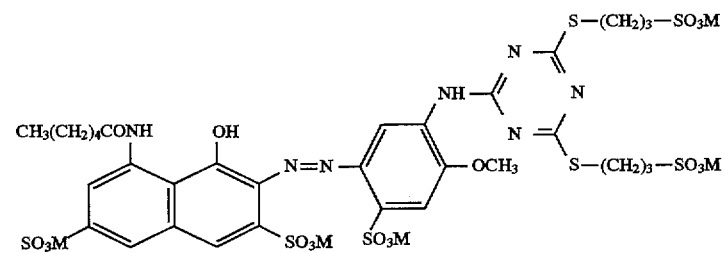
(109)

-continued
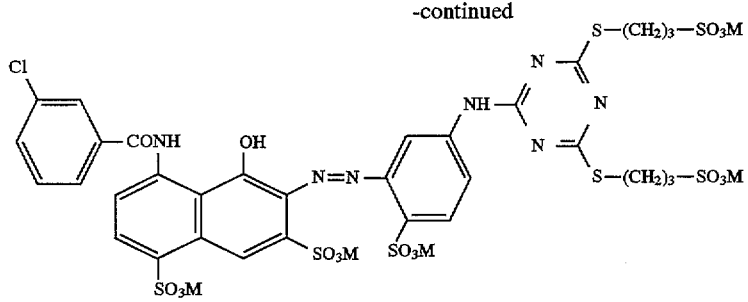
(110)
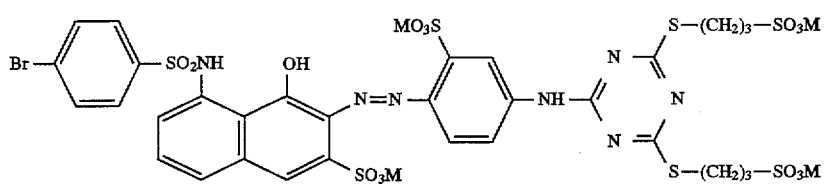
(111)
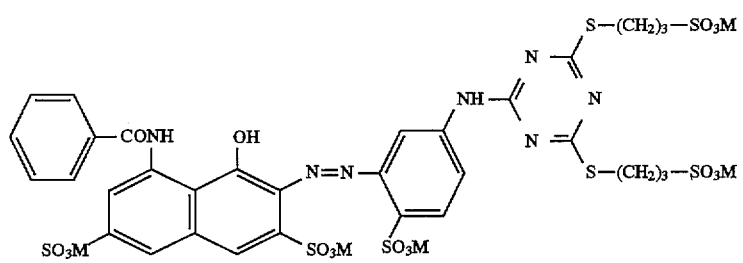
(112)
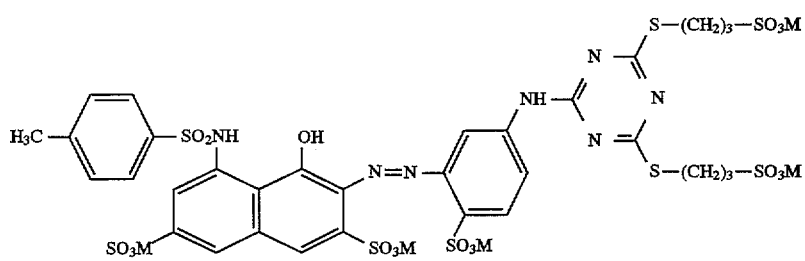
(113)
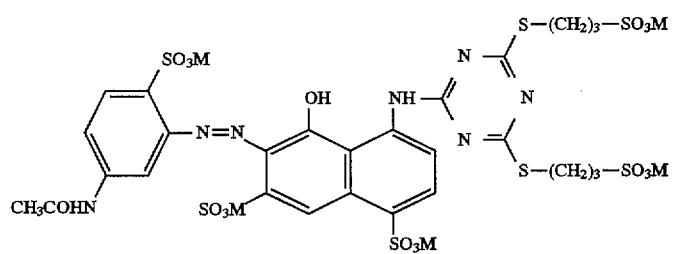
(114)
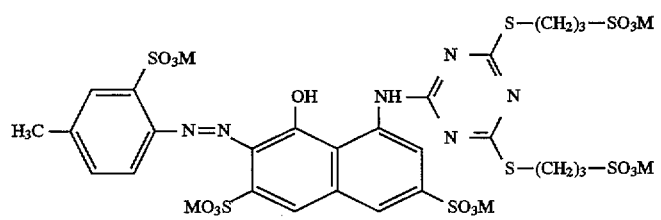
(115)
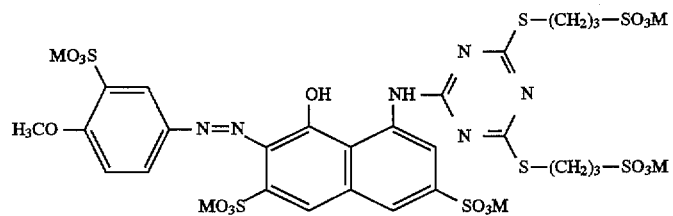
(116)

-continued
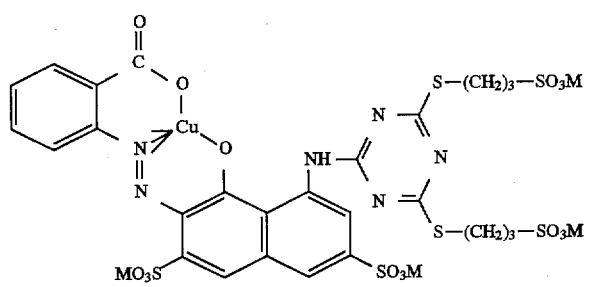
(117)
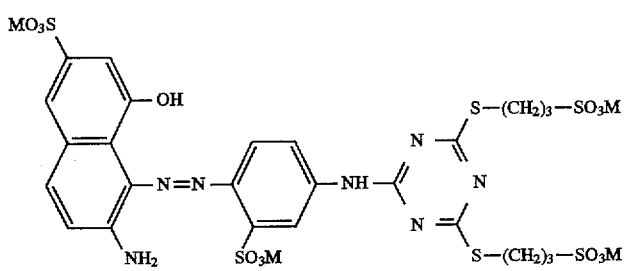
(118)
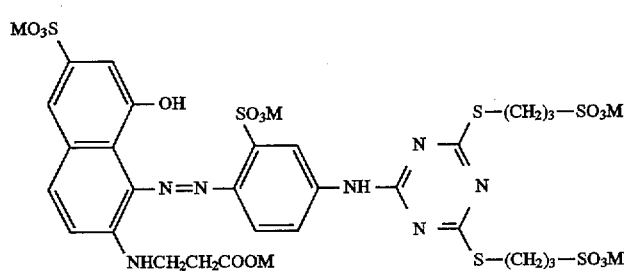
(119)
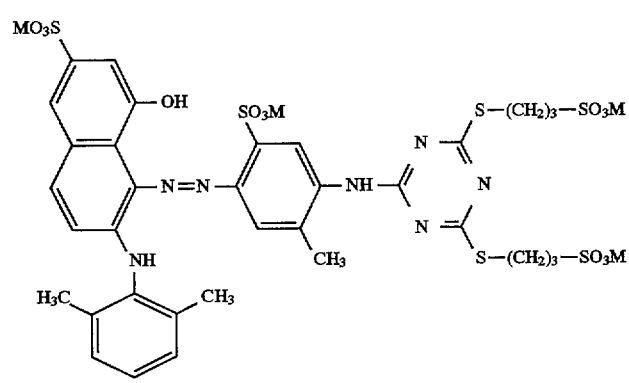
(120)
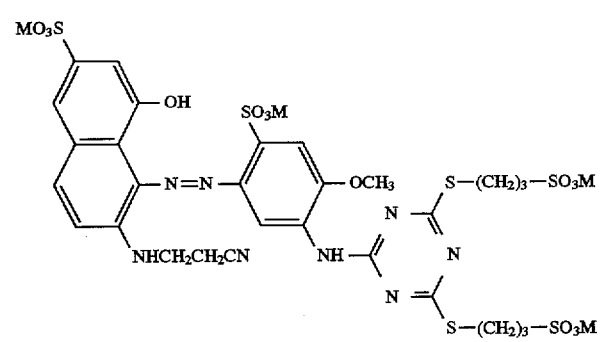
(121)

-continued
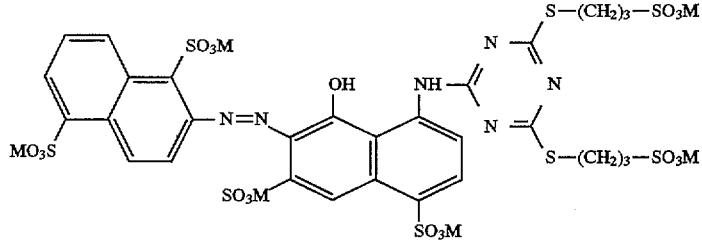
(122)
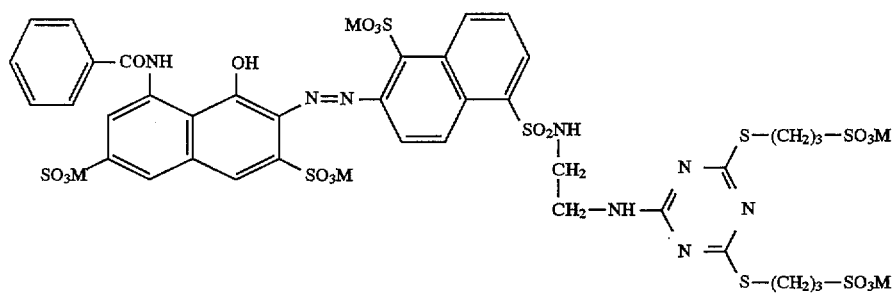
(123)
Specific embodiments of the dyes represented by the formula (4) where F represents a poly-azo dye residue are illustrated below.
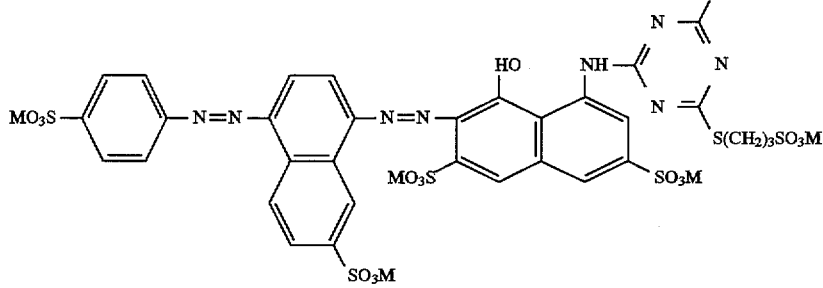
(124)
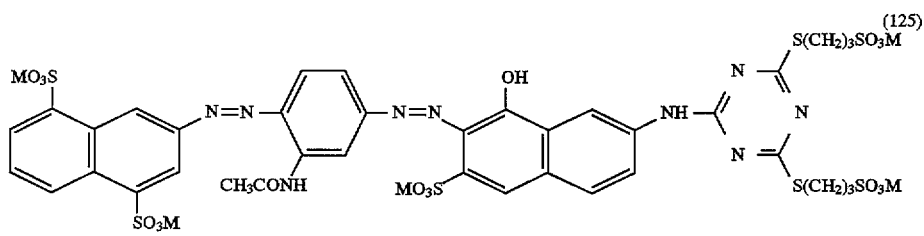
(125)
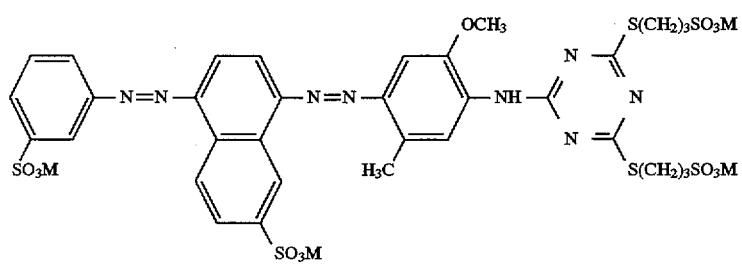
(126)
Dye synthesis
The above dyes can be prepared by conventional methods, for example:
(i) Reacting a compound of formula (5)
(5)

with cyanuric chloride under conditions such that one chlorine atom of the triazine is displaced by the amino-dye compound of formula (5), then (ii) reacting the mono-substituted dichloro-triazine with a compound of formula (6)

$$Hs-(CH_2)_n-SO_3M \qquad (6)$$

under conditions such that a second atom of chlorine is displaced by the compound of formula (5) and reacting finally (iii) the di-substituted triazine with a compound of formula (7)

$$HS-(CH_2)_m-SO_3M \qquad (7)$$

under conditions that the third chlorine atom is displaced.

When the compounds of formula (6) and (7) are identical, the second and third chlorine atom of the triazine nucleus may be displaced simultaneously.

F, R, m and n in compounds (5) to (7) are as defined above.

Preparation of specific dyes represented by the formula (4) may be illustrated by the following examples which are only illustrative but not limitative.

EXAMPLE 1

Preparation of the Compound No. 100 (Na-Salt)

62.4 g (0,126 mol) monoazo compound of formula (8)

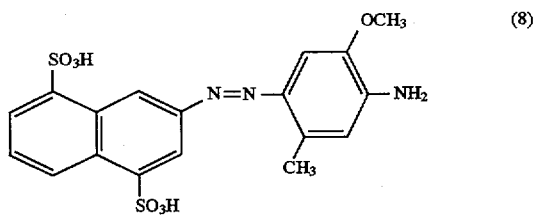

(prepared as described in U.S. Pat. No. 3,264,109) was added to water (200 ml) and the pH adjusted to 9.5 by addition of 30 % sodium hydroxide solution.

A solution of cyanuric chloride (25.4 g, 0,138 mol) in ethyl acetate (90 ml) was added maintaining the pH at 8.2–8.5 and the temperature at 20°–25° C. After 30 minutes a solution of 3-mercapto-1-propane sulfonic acid sodium salt (24.6 g, 0.138 mol) in water (50 ml) was added to the reaction mixture while maintaining the pH at 8 and the temperature at 25° C. The reaction mixture was stirred for 1 hour at this temperature and pH. After that, sodium carbonate (6.7 g, 0.063 mol) and a solution of 3-mercapto-1-propane sulfonic acid sodium salt (24.8 g, 0,139 mol) in water (50 ml) was added and the reaction mixture heated to 70° C. for 4 hours and then cooled to room temperature. Acetic acid (0.7 ml) was added to obtain a pH value of 6 followed by an addition of ethanol (700 ml). The solid was collected by filtration, washed with ethanol (150 ml), dried in vacuum at 60° C. to yield the yellow dye (114 g) of formula (100).

In an analogous manner using appropriate staffing materials the dyes shown in Table 1 were prepared.

TABLE 1

| Compound No. | M | λ max (nm) in H2O |
|---|---|---|
| 100 | Na | 401 |
| 102 | Na | 394 |
| 103 | Na | 383 |
| 104 | K | 383 |
| 105 | Na | 391 |
| 106 | Na | 404 |
| 107 | Na | 421 |
| 109 | Na | 530 |
| 111 | Na | 526 |
| 112 | Na | 512 |
| 113 | K | 527 |
| 115 | K | 543 |
| 116 | Na | 555 |
| 117 | Na | 547 |
| 118 | Na | 518 |
| 119 | Na | 535 |
| 120 | Na | 529 |
| 121 | Na | 542 |
| 122 | Na | 543 |

Dye solubility

The solubilities of the dyes according to the invention were determined as follows:

An excess of dye was heated at 50° C. in water with stirring for one hour. The mixture was then cooled down to 20° C. and filtered, and the dye content of the clear solution was determined spectroscopically. The results obtained are shown in table 2.

TABLE 2

| Dye No. | Solubility (in g per 100 ml) |
|---|---|
| dye 1 | 11 |
| dye 5 | 17 |
| 100 | 34 |
| 103 | 30 |
| 112 | 44 |
| 118 | 43 |

The dyes 1 and 5 are known from U.S. Pat. Nos. 4,777,248 and 4,771,129.

The results in table 2 show the significantly higher solubility of the dyes according to the invention compared to dyes of the prior art.

The dyes of the present invention are specially adapted for the preparation of inks. Inks for ink jet printing are well known. These inks consist in essence of a liquid vehicle dissolved therein a dye. The liquid vehicle of the inks employed for the printing consists in general of water or a mixture of water and a miscible organic solvent such as C1–C4 alkanols, 1-methoxy-2-propanol, alkylene glycols such as ethylene glycol, propylene glycol, di(propylene glycol), di-(ethylene glycol), polyols such as 1,3-butanediol, 1,5-pentanediol, cyclohexanediol, 1,1,1-tris-(hydroxymethyl)-propane, glycerol, 1,2,6-trihydroxy-hexane, nitrogen-containing solvents such as 2-pyrrolidinone, N-methyl-2-pyrrolidinone, 1-(2-hydroxyethyl)-2-pyrrolidinone, 1,3-dimethyl-2-imidazolidinone, 1,1,3,3-tetramethylurea or sulfur containing solvents such as organosulfoxides, sulfolane and the like.

The non water parts of the printing ink generally serve as humefactant, cosolvent, vent, viscosity regulating agent, ink penetration additive, levelling agent or drying agent.

In addition aqueous inks may contain miscellaneous known additives like viscosity modifiers, such as cellulose derivatives and other water-soluble resins, various kinds of surfactants, surface tension modifiers, optical brighteners, UV absorbers, light stabilisers, biocides and pH conditioners, such as buffers.

Inks for use in ink jet recording of the type based on continuous-stream usually contain an inorganic salt as electrolyte, such as sodium/ammonium/lithium halogenides or sulphates.

This description of inks is for illustration only and is not to be considered as limiting the invention.

Preparation Example of Inks

The present invention in so far as it relates to inks is further illustrated by using dyes described in Table 1. 100 g of each ink were prepared by heating the ingredients (g) shown in table 3 together with water to a temperature of approximately 50° C. under stirring for one hour to make a solution and passing the solution under pressure through a Millipore filter of 0.5 micron pore diameter. Examples 5 to 10 use dyes according to our invention, whereas examples C-11 and C-12 use dyes of the prior art.

TABLE 3

| Ink ingredients | Example No. | | | | | | | |
|---|---|---|---|---|---|---|---|---|
| | 5 | 6 | 7 | 8 | 9 | 10 | C-11 | C-12 |
| Dye No. | 100 | 118 | 112 | 105 | 103 | 100 | 1 | 5 |
| Dye | 4 | 4 | 4 | 4 | 4 | 4 | 4 | 4 |
| Diethylene glycol | 20 | | 20 | | 20 | | 20 | 20 |
| Ethylene glycol | | 20 | | | | | | |
| 1,5-Pentanediol | | | | 20 | | | | |
| Glycerol | | | | | | 20 | | |
| Sodium acetote | 1 | | 1 | | 1 | | 1 | 1 |
| Lithium sulfate | | 0.5 | | 0.5 | | | | |
| Ammonium chloride | | | | | | 1 | | |
| Methyl-4-hydroxybenzoate | 0.1 | 0.1 | 0.1 | 0.1 | 0.1 | 0.1 | 0.1 | 0.1 |

Application Example of Inks

An ink receiving sheet for the testing procedures was prepared in the following way:

30 g gelatine with a high isoelectric point (Stoess type 70810) were dissolved in 360 ml of deionised water. To this solution was added 1 g of a surfactant (Olin 10 G, obtained from Olin Corporation). Immediately before coating 6.6 g of a 3% solution of 2-(4-dimethyl-carbamoyl-pyridino)-ethane-sulfonate was added. The solution was then coated onto a subbed polyester support using a barcoater. The sheets were dried for 12 hours.

The inks shown above in Table 3 were separately charged in an IRIS ink jet printer type 3024 to evaluate their jetting and printing performance. The measurement methods for (A) storage stability, (B) jet stability, (C) quality of image, (D) smudge resistance and (E) water fastness are as follows:
(A) Storage stability The ink was placed in a glass bottle, hermetically sealed and allowed to stand at 0° C. or 50° C. for 30 days. After that time degree of precipitation was observed and evaluated according to the following criteria:
⊕: No precipitation
◊: Little precipitation
∅: Much precipitation (B) Jet stability The jet recording mentioned above was continued for 100 hours and the clogging of the nozzle and the change of direction were observed after this time:
⊕: Normal
◊: Somewhat abnormal
∅: Abnormal (C) Image quality The print (on an ink receiving sheet) was judged concerning the sharpness and the density of the image according to the following criteria:
⊕: No blurring and high density
◊: Slight blurring and high density
∅: Severe blurring and low density (D) Smudge resistance The smudge resistance was evaluated by determining the degree of smear of the dye in images printed on a ink receiving sheet according to the following criteria:
⊕: Little smear
◊: Slight smear
∅: Severe smear (E) Water fastness An image was recorded on a ink receiving sheet, allowed to stand for 6 hours and immersed in water of room temperature for one minute. Then the degree of bleeding of the dye was evaluated according to the following criteria:
Δ: No bleeding
◊: Slight bleeding
∅: Severe bleeding (F) Light fastness An image was recorded on a ink receiving sheet and irradiated using a Atlas Weather-Ometer with a 2500 W-Xenon lamp until a total illumination of 40 kjoule/cm² was reached. The loss was measured using an X-rite densitometer:
⊕: less than 10% fading
◊: more than 10% fading The results of the tests of these properties are given in Table 4.

TABLE 4

| Example No. | Properties evaluated on items | | | | | |
|---|---|---|---|---|---|---|
| | (A) | (B) | (C) | (D) | (E) | (F) |
| 5 | ⊕ | ⊕ | ⊕ | ⊕ | ⊕ | ⊕ |
| 6 | ⊕ | ⊕ | ⊕ | ⊕ | ⊕ | ⊕ |
| 7 | ⊕ | ⊕ | ⊕ | ⊕ | ⊕ | ◊ |
| 8 | ⊕ | ⊕ | ⊕ | ⊕ | ◊ | ◊ |
| 9 | ⊕ | ⊕ | ⊕ | ⊕ | ⊕ | ⊕ |
| 10 | ⊕ | ⊕ | ⊕ | ⊕ | ⊕ | ⊕ |
| C-12 | ∅ | ◊ | ◊ | ⊕ | ◊ | ◊ |
| C-11 | ◊ | ◊ | ◊ | ◊ | ⊕ | ⊕ |

It is clearly demonstrated from the results in table 4 that these highly soluble dyes of the invention (examples 5 to 10) represented by the general formula (4) used in ink compositions lead to improved storage and jet stability compared with dyes of the prior art (examples C-11 and C-12). Surprisingly they show high water fastness and smudge resistance once on the receiving sheet. In addition, the dyes of the present invention can provide images with high quality and excellent light fastness.

I claim:

1. An azo dye of formula (4)

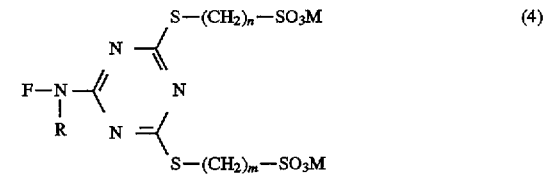

where n,m are each independently 2 to 6;

R is hydrogen or an aliphatic radical having from 1 to 6 C atoms;

M is hydrogen or a metal atom, an ammonium or ammonium substituted with alkyl, alkoxyalkyl and hydroxyalkyl each having 1 to 12 C atoms; and F represents a mono-azo or poly-azo dye radical.

2. A dye according to claim 1 where

M is an alkali metal and n, m, R and F are as defined in claim 1.

3. A dye of formula (20) according to claim 1

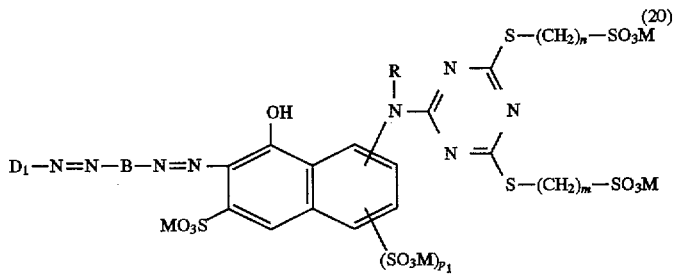

where n, m, R and M are as defined in claim 1; and

B is a group represented by

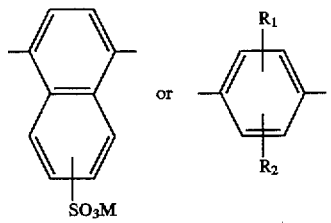

$R_1$, $R_2$ are independently selected from hydrogen, $C_1$–$C_4$ alkyl, $C_1$–$C_4$ alkoxy, chloro, bromo, carboxy or sulfo;

$D_1$ is phenyl or phenyl substituted once or twice by a substituent selected from the group consisting of alkyl, alkoxy, chloro, bromo, carboxy, sulfo or is naphthyl unsubstituted or substituted once or twice by sulfo; and $p_1$ is 0 or 1.

4. A dye of formula (21) according to claim 1

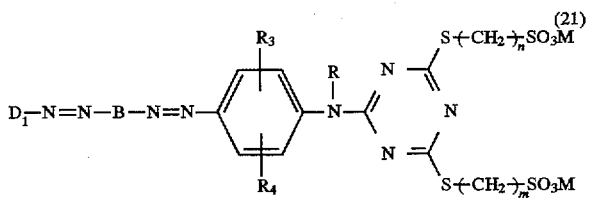

where n, m, R and M are as defined in claim 1 and $D_1$ and B are as defined in claim 3; and $R_3$, $R_4$ are independently selected from hydrogen, alkyl or alkoxy or acylamino containing up to 3 C atoms.

5. A dye of formula (22) according to claim 1

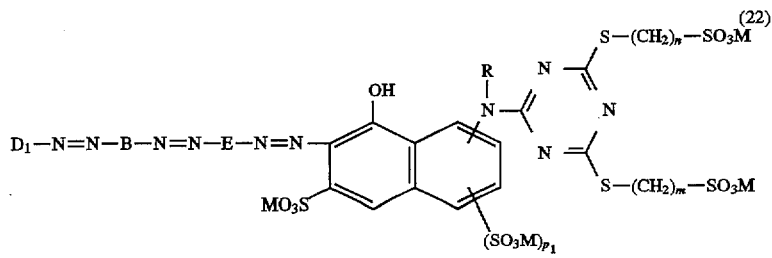

where n, m, R and M are as defined in claim 1 and $D_1$, B and $p_1$ are as defined in claim 3; and E is phenyl or phenyl substituted once or twice by a substituent selected from the group consisting of alkyl, alkoxy, chloro, bromo, carboxy, sulfo or is naphthyl unsubstituted or substituted once or twice by sulfo, hydroxy, amino.

6. A dye of formula (23) according to claim 1

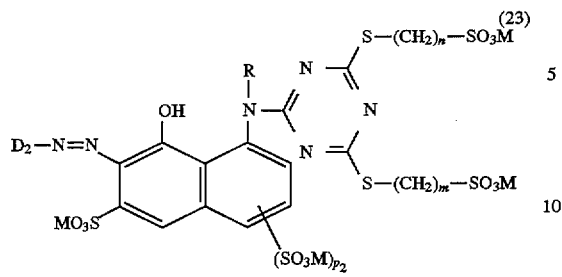

where
n, m, R and M are as defined in claim 1; and $D_2$ is phenyl or phenyl substituted once or twice by a substituent selected from the group consisting of alkyl, alkoxy, chloro, bromo, carboxy and sulfo or is naphthyl unsubstituted or substituted once or twice by sulfo; and $P_2$ is 0 or 1.

7. A dye of formula (24) according to claim 1

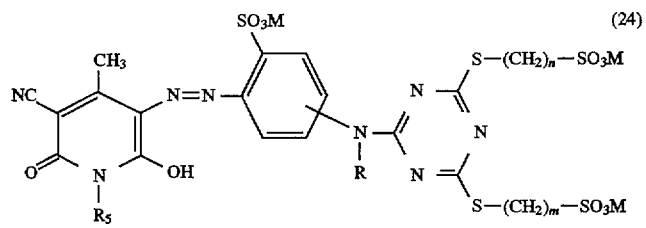

where
n, m, R and M are as defined in claim 1; and $R_5$ is hydrogen, an alkyl of 1 to 6 C atoms, C2 to C6 substituted alkyl where the substituents are selected from carboxy, hydroxy, sulfo or $R_5$ is phenyl or phenyl substituted by methyl, chloro, bromo, sulfo.

8. A dye of formula (25) according to claim 1

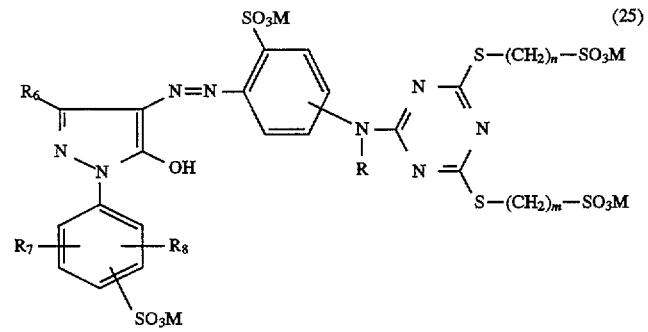

where
n, m, R and M are as defined in claim 1; and
$R_6$ is $CH_3$, COOH;
$R_7$, $R_8$ are independently selected from hydrogen, chloro, bromo, methyl.

9. A dye of formula (26) according to claim 1

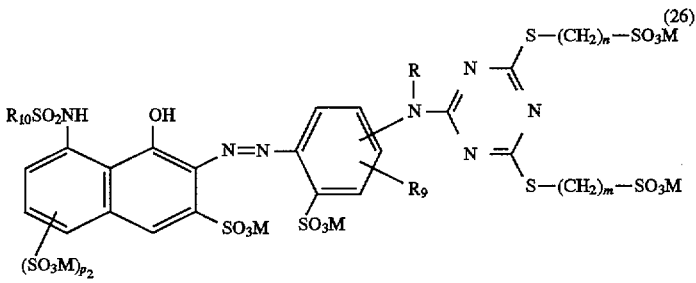

where n, m, R and M are as defined in claim 1; and $R_9$ is hydrogen, alkyl or alkoxy containing up to 3 C atoms;

$R_{10}$ is an alkyl of 1 to 8 C atoms; phenyl or phenyl substituted by one or more substituents selected from chloro, bromo, alkyl or alkoxy with 1 to 4 C atoms; and P2 is 0 or 1.

10. A dye of formula (27) according to claim 1

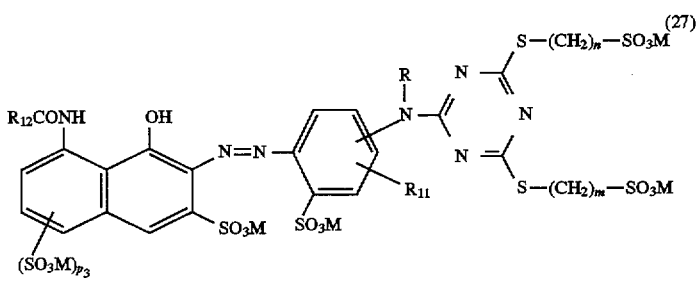

where n, m, R and M are as defined in claim 1; and $R_{11}$ is hydrogen, alkyl or alkoxy containing up to 3 C atoms;

$R_{12}$ is an alkyl of 1 to 8 C atoms, $C_1$ to $C_6$ substituted alkyl where the substituents are selected from $COOCH_3$, COOH, halogen or $R_{10}$ is phenyl or phenyl substituted by one or more substituents selected from chloro, bromo, C1–C4 alkyl or alkoxy or alkylcarbonylamino or alkylsulfonyl, pyridine; and $P_3$ is 0 or 1.

11. A dye of formula (28) according to claim 1

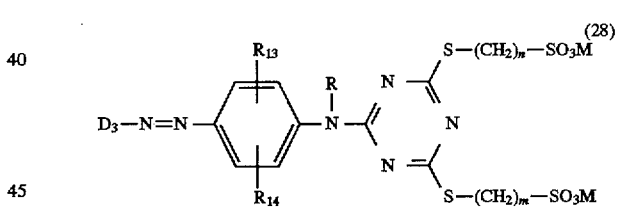

where n, m, R and M are as define8 in claim 1; and $D_3$ is phenyl or phenyl substituted once or twice by a substituent selected from sulfo, chloro, bromo, carboxy, alkyl or alkoxy;

$R_{13}$, $R_{14}$ are independently selected from hydrogen, ureido, alkyl or alkoxy or acylamino containing up to 3 C atoms.

12. A dye of formula (29) according to claim 1

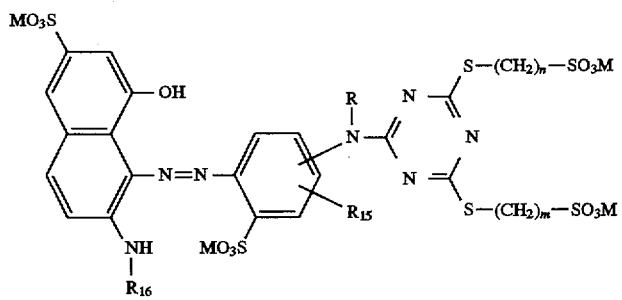

where n, m, R and M are as defined in claim 1; and $R_{15}$ is hydrogen, alkyl or alkoxy containing up to 3 C atoms;

$R_{16}$ is hydrogen, alkyl of 1to 6 C atoms, C2 to C6 substituted alkyl where the substituents are selected from CN, COOH, OH, $COOCH_3$, $COOCH_2CH_3$, $COCH_3$ or $R_{14}$ is phenyl or phenyl substituted by methyl, chloro, bromo.

13. A dye of formula (30) according to claim 1

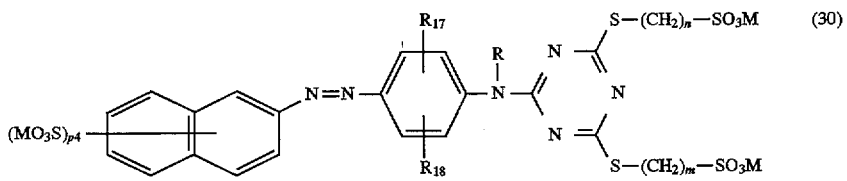

where n, m, R and M are as defined in claim 1; and $R_{17}$, $R_{18}$ are independently selected from hydrogen, ureido, alkyl or alkoxy or acylamino containing up to 3 C atoms;

$P_4$ is 1, 2 or 3 and the substitution pattern is selected from 4,8/ 5,7/6,8/1,5/ 3,6,8 or 4,6,8, and in a case where $p_4$ is 1, $SO_3H$ is also in position 1 or 4 to 8.

14. A dye according to claim 1 where n,m are identical and are selected from 2 to 4;

R is hydrogen;

M is as defined in claim 2 and

F is as set forth in claims 3 to 13.

* * * * *